(12) United States Patent
Mao (10) Patent No.: US 9,758,314 B2
(45) Date of Patent: Sep. 12, 2017

(54) ROTARY DEVICE CAPABLE OF ADJUSTING POSITION OF A BOX

(71) Applicant: Wistron Corporation, New Taipei (TW)

(72) Inventor: Zhong-hui Mao, New Taipei (TW)

(73) Assignee: Wistron Corporation, New Taipei (TW)

( * ) Notice: Subject to any disclaimer, the term of this patent is extended or adjusted under 35 U.S.C. 154(b) by 177 days.

(21) Appl. No.: 14/644,176

(22) Filed: Mar. 10, 2015

(65) Prior Publication Data
US 2016/0052725 A1    Feb. 25, 2016

(30) Foreign Application Priority Data

Aug. 20, 2014   (CN) .................. 2014 2 0471114 U (51) Int. Cl.
*B65G 47/24*       (2006.01)
*B65G 47/252*      (2006.01)

(52) U.S. Cl.
CPC .................. *B65G 47/252* (2013.01)

(58) Field of Classification Search
CPC .... B65G 47/24; B65G 47/244; B65G 47/248; B65G 47/256; B65G 47/252
USPC .......... 414/754–784; 198/402, 403
See application file for complete search history.

(56) References Cited

U.S. PATENT DOCUMENTS

| | | | | |
|---|---|---|---|---|
| 591,712 A * | 10/1897 | Worth | .................. | B65G 47/252 198/403 |
| 1,390,853 A * | 9/1921 | Worth | ..................... | B21B 39/32 72/203 |
| 2,981,420 A * | 4/1961 | Johanson | ............... | B65H 29/00 414/789.1 |
| 3,589,532 A * | 6/1971 | Filkins | ................. | B65G 47/252 414/759 |
| 3,780,882 A * | 12/1973 | Wagner | ................... | B21B 39/32 198/403 |
| 3,812,982 A * | 5/1974 | Crandlemire | .......... | B65G 65/00 414/771 |
| 3,954,170 A * | 5/1976 | Schlough | ............. | B65G 47/252 193/35 J |

(Continued)

FOREIGN PATENT DOCUMENTS

TW     M449958     4/2013

*Primary Examiner* — Anna Momper
*Assistant Examiner* — Lynn Schwenning
(74) *Attorney, Agent, or Firm* — Winston Hsu (57) ABSTRACT

A rotary device includes a bracket, a first supporting module, a second supporting module and a driving module. The two supporting modules respectively have a pivot end and a connective end. The two pivot ends are pivotally connected to different and adjacent position of the bracket. The driving module is utilized to reversely rotate the first supporting module and the second supporting module, simultaneously. The driving module includes an actuating component, a first rod and a second rod. The first rod is connected between the first connective end and a side of the actuating component. The second rod is connected between the second connective end and an opposite side of the actuating component. When the actuating component rotates at a first direction, the first rod rotates the first supporting module at a second direction, and the second rod rotates the second supporting module at the first direction.

15 Claims, 8 Drawing Sheets

(56) References Cited

U.S. PATENT DOCUMENTS

| | | | | |
|---|---|---|---|---|
| 4,342,531 A * | 8/1982 | Cox | ............... | B65G 57/081 |
| | | | | 198/374 |
| 4,454,781 A * | 6/1984 | Orii | ............... | B21D 43/105 |
| | | | | 74/99 R |
| 4,533,291 A * | 8/1985 | Nishida | ............... | B21D 43/105 |
| | | | | 100/207 |
| 4,793,463 A * | 12/1988 | Kane | ............... | B65G 47/252 |
| | | | | 198/403 |
| 4,890,717 A * | 1/1990 | Kane | ............... | B65G 47/252 |
| | | | | 198/403 |
| 7,985,044 B2 * | 7/2011 | Tamura | ............... | B65G 7/08 |
| | | | | 414/759 |
| 2001/0022931 A1 * | 9/2001 | Ewaschuk | ............... | B23Q 7/005 |
| | | | | 414/759 |
| 2010/0196133 A1 * | 8/2010 | Pass | ............... | B21B 39/32 |
| | | | | 414/759 |
| 2012/0177475 A1 * | 7/2012 | Nguyen | ............... | B23Q 3/18 |
| | | | | 414/777 |
| 2014/0154040 A1 * | 6/2014 | Su | ............... | B65H 15/00 |
| | | | | 414/771 |
| 2014/0219765 A1 * | 8/2014 | Tillman | ............... | B65G 47/252 |
| | | | | 414/771 |

* cited by examiner

ROTARY DEVICE CAPABLE OF ADJUSTING POSITION OF A BOX

BACKGROUND OF THE DISCLOSURE

1. Field of the Disclosure

The present disclosure relates to a rotary device, and more particularly, to a rotary device capable of adjusting position of a box.

2. Description of the Prior Art

A box of an electronic apparatus is frequently turned over to install electronic components and/or mechanical components into the box via its opening when the electronic apparatus is packaged on the production line. Most of the conventional production line uses manual operation to turn over the box of the electronic apparatus, an exterior surface of the box is easily polluted or damaged by the manual operation due to huge dimensions and excessive weight of the box, or the box may be deformed because some areas of the box that has weak strength is buckled or pressed by the manual operation. Although some of the automatic production line provides the robotic manipulator to turn over the box, the conventional robotic manipulator utilizes mechanical buckling technique or vacuum sucking technique to grab the box, and then turns the box to a predetermined position and a predetermined angle by rotating mechanism and/or shifting mechanism. The conventional robotic manipulator in need of wide working space has drawbacks of large volume and expensive apparatus cost, and appearance of the box is possibly deformed by improper force exertion of the robotic manipulator.

SUMMARY OF THE DISCLOSURE

The present disclosure provides a rotary device capable of adjusting position of a box for solving above drawbacks.

According to the claimed disclosure, a rotary device capable of adjusting position of a box is disclosed. The rotary device includes a bracket, a first supporting module, a second supporting module and a driving module. The first supporting module pivots to the bracket. The second supporting module pivots to the bracket. The driving module is adapted to reversely rotate the first supporting module and the second supporting module simultaneously. The driving module includes an actuating component, a first rod and a second rod. The first rod is connected to the first supporting module and a side of the actuating component. The second rod is connected to the second supporting module and the other side of the actuating component. The first rod drives the first supporting module to rotate at a second direction and the second rod drives the second supporting module to rotate at a first direction since the actuating component rotates at the first direction. The first direction is opposite to the second direction.

According to the claimed disclosure, the first supporting module comprises a first pivot end and a first connective end, the first pivot end pivots to the bracket, and the first rod is connected to the first connective end.

According to the claimed disclosure, the second supporting module comprises a second pivot end and a second connective end, the second pivot end pivots to the bracket and is adjacent to the first pivot end, and the second rod is connected to the second connective end.

According to the claimed disclosure, the actuating component is a tray-shaped structure. The first rod and the second rod are respectively connected to different positions on an edge of the tray-shaped structure.

According to the claimed disclosure, the driving module further includes a handle disposed on the actuating component.

According to the claimed disclosure, the driving module further includes an electric motor and a towing belt. The towing belt is disposed between the electric motor and the actuating component. The electric motor utilizes the towing belt to rotate the actuating component.

According to the claimed disclosure, the driving module further includes a holding component disposed on the bracket. The actuating component is rotatably disposed on the holding component, and the holding component includes a contacting portion to constrain a rotating range of the actuating component.

According to the claimed disclosure, the first supporting module includes two first lateral plates, a plurality of first rollers and a first contact plate. The plurality of first rollers is rotatably disposed between the two first lateral plates. The first contact plate is disposed on a side of the plurality of first rollers adjacent to the second supporting module.

According to the claimed disclosure, the first supporting module further includes a first supporting component disposed between the two first lateral plates and located under the plurality of first rollers.

According to the claimed disclosure, outer surfaces of the plurality of first rollers substantially protrude from an upper surface of the first lateral plate.

According to the claimed disclosure, the first supporting module further includes a first open end, and the plurality of first rollers is located between the first open end and the first pivot end.

According to the claimed disclosure, the first lateral plate is a curved structure. The first open end and the first connective end respectively are edge points of the curved structure, and the first pivot end is a corner point of the curved structure.

According to the claimed disclosure, the second supporting module includes two second lateral plates, a plurality of second rollers and a second contact plate. The plurality of second rollers is rotatably disposed between the two second lateral plates. The second contact plate is disposed on aside of the plurality of second rollers adjacent to the first supporting module.

According to the claimed disclosure, the first supporting module and the second supporting module rotate relative to the bracket to switch between a recumbent position and an upright position.

According to the claimed disclosure, a first rotating angle of the first supporting module switching from the recumbent position to the upright position is substantially greater than a second rotating angle of the second supporting module switching from the recumbent position to the upright position.

According to the claimed disclosure, the first contact plate contacts against the second contact plate since the first supporting module and the second supporting module are switched to the upright position.

The present disclosure drives the first supporting module and the second supporting module to generate reverse rotation to turn over the box, so the box is not buckled or pressed at any specific area, the box does not generate partial deformation by local pressure and can have aesthetic appearance.

These and other objectives of the present disclosure will no doubt become obvious to those of ordinary skill in the art after reading the following detailed description of the preferred embodiment that is illustrated in the various figures and drawings.

DETAILED DESCRIPTION

Figure 1:
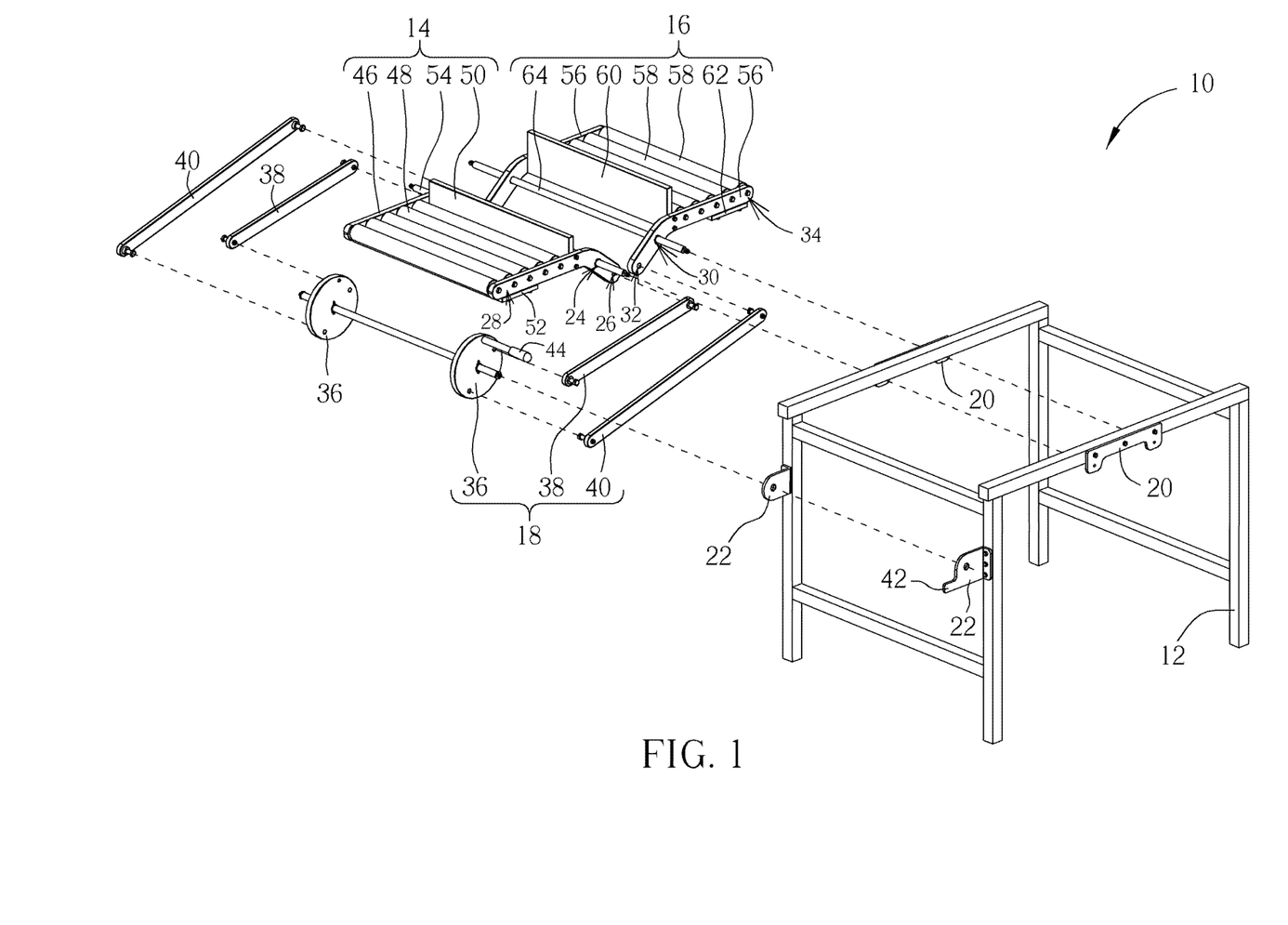
FIG. 1 is an exploded diagram of a rotary device according to an embodiment of the present disclosure.
Figure 2:
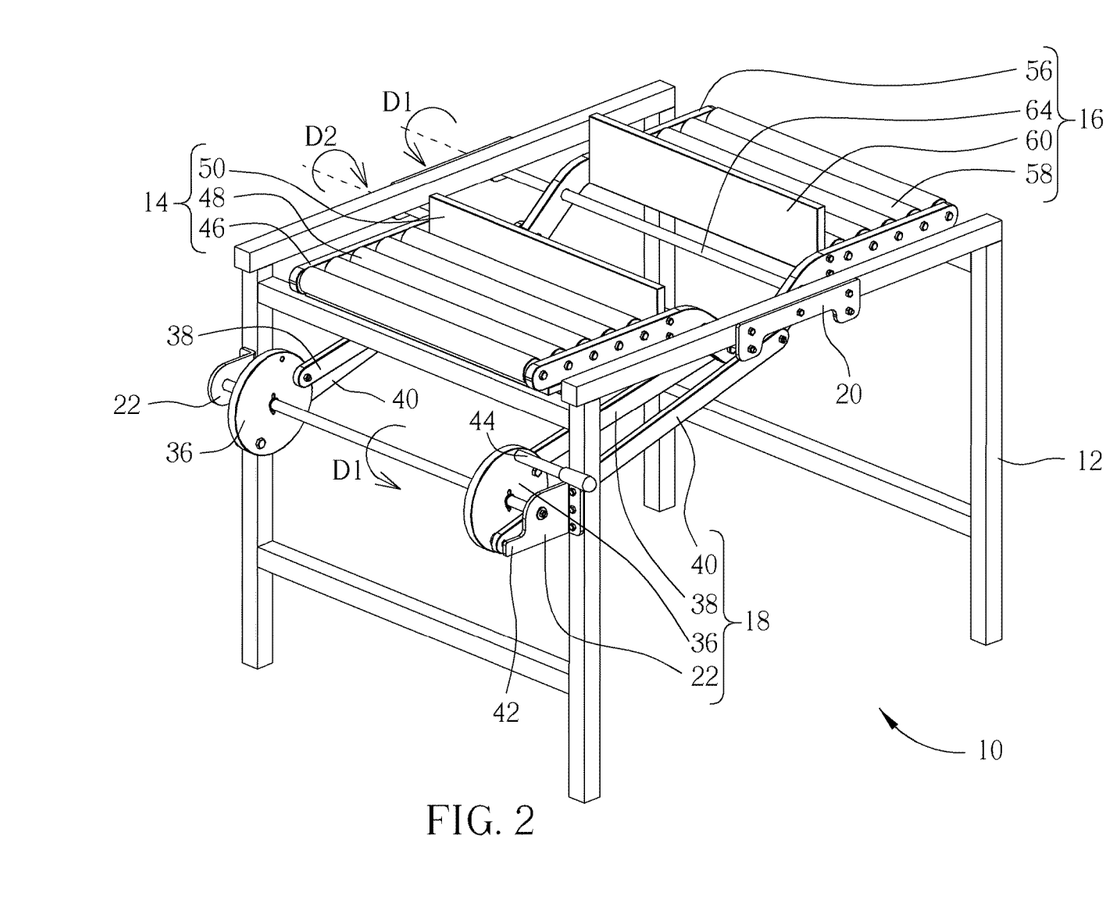
FIG. 2 and FIG. 3 respectively are diagrams of the rotary device in different operational modes according to the embodiment of the present disclosure.
Figure 3:
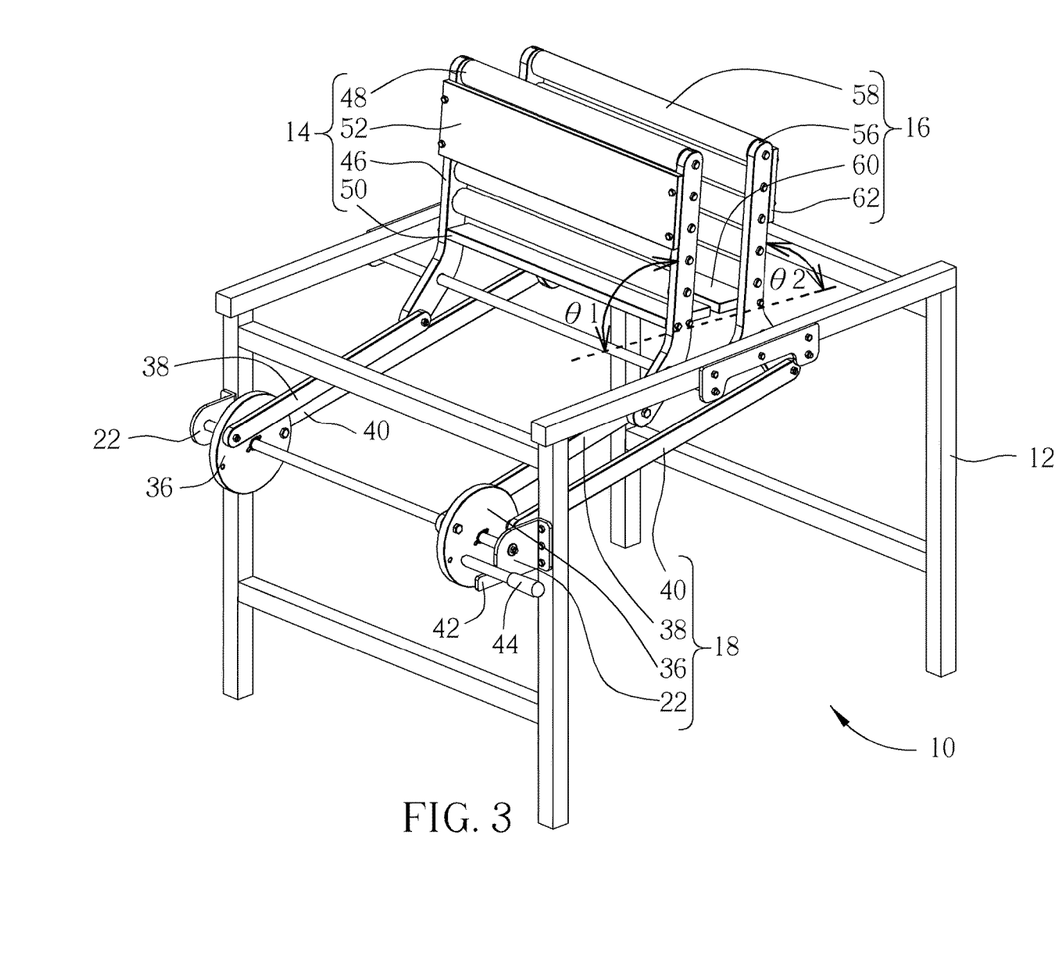

Please refer to FIG. 1 to FIG. 3. FIG. 1 is an exploded diagram of a rotary device 10 according to an embodiment of the present disclosure. FIG. 2 and FIG. 3 respectively are diagrams of the rotary device 10 in different operational modes according to the embodiment of the present disclosure. The rotary device 10 includes a bracket 12, a first supporting module 14, a second supporting module 16 and a driving module 18. The bracket 12 includes a plurality of shaft hole portions 20 and a plurality of holding components 22 disposed on a frame in symmetry. The first supporting module 14 includes a first pivot end 24, a first connective end 26 and a first open end 28. The first supporting module 14 pivots to the shaft hole portion 20 of the bracket 12 via the first pivot end 24. The second supporting module 16 includes a second pivot end 30, a second connective end 32 and a second open end 34. The second supporting module 16 pivots to the shaft hole portion 20 of the bracket 12 via the second pivot end 30, and the second pivot end 30 is located adjacent to the first pivot end 24.

The driving module 18 includes an actuating component 36, a first rod 38 and a second rod 40. The actuating component 36 is rotatably disposed on the holding component 22, and a contact portion 42 of the holding component 22 is utilized to constrain a rotating range of the actuating component 36. For example, the actuating component 36 includes a handle 44, the contact portion 42 is located on a tracking path of the handle 44, and the actuating component 36 cannot rotate since the handle 44 contacts against the contact portion 42. Two ends of the first rod 38 are respectively connected to the first connective end 26 and a side of the actuating component 36. Two ends of the second rod 40 are respectively connected to the second connective end 32 and the other opposite side of the actuating component 36. The user utilizes the handle 44 to rotate the actuating component 36 at a first direction D1, the first rod 38 can drive the first supporting module 14 to rotate at a second direction D2, and the second rod 40 can drive the second supporting module 16 to rotate at the first direction D1. That is, a rotating direction of the first supporting module 14 is always opposite to a rotating direction of the second supporting module 16. The first direction D1 is a counterclockwise direction and the second direction D2 is a clockwise direction.

The actuating component 36 can be a tray-shaped structure. The handle 44, the first rod 38 and the second rod 40 are respectively connected to different positions on an edge of the tray-shaped structure. The driving module 18 has effort-saving function because of a longer distance between the handle 44 and an axial center of the tray-shaped structure. The actuating component 36 not only can be the tray-shaped structure as mentioned above, but also can be any polygonal structure, such as a triangular structure or a hexagonal structure. Any structure that the first rod 38 and the second rod 40 are respectively connected to opposite positions relative to the axial center of the actuating component 36 and rotation of the actuating component 36 can drive the first rod 38 and the second rod 40 to generate reverse motion belongs to scope of the present disclosure.

Figure 4:
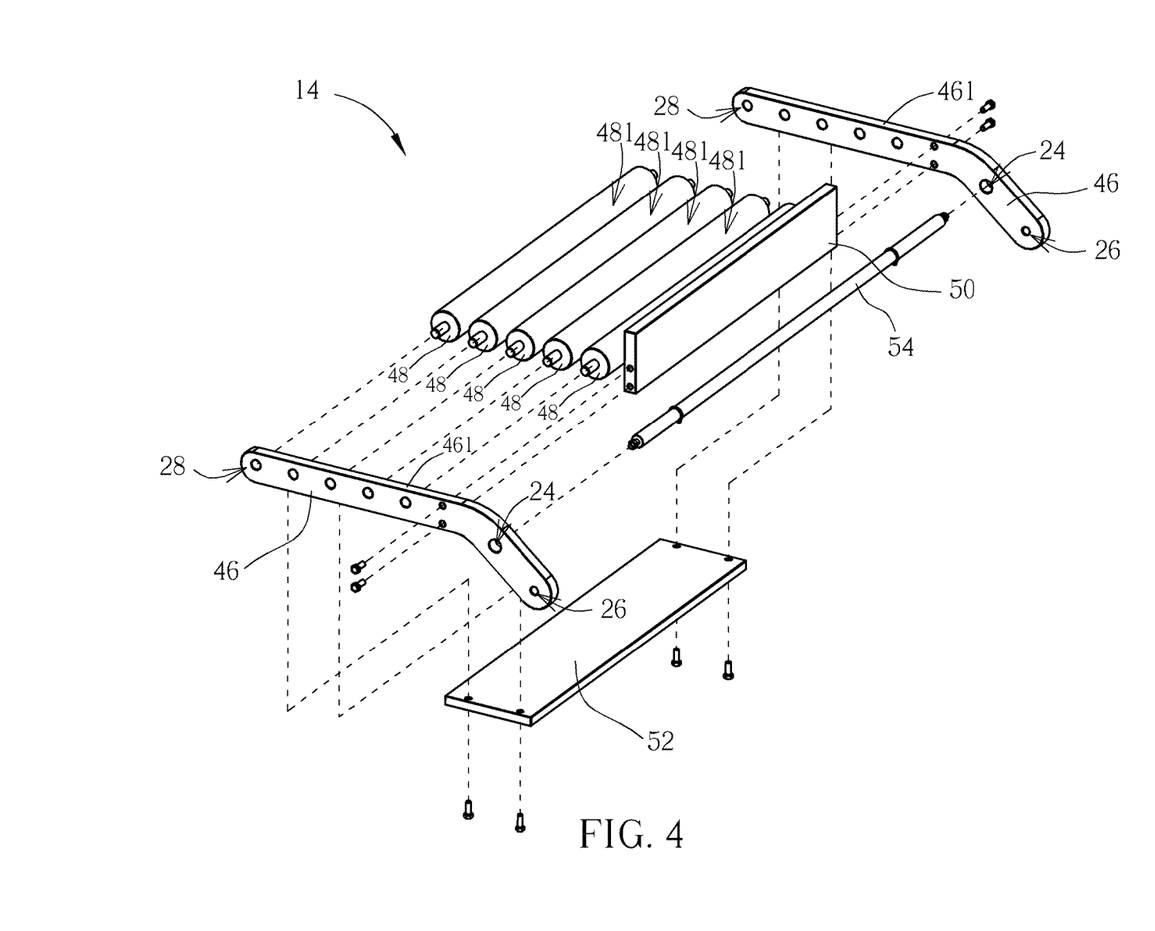
FIG. 4 is an exploded diagram of a first supporting module according to the embodiment of the present disclosure.

Please refer to FIG. 1 to FIG. 4. FIG. 4 is an exploded diagram of the first supporting module 14 according to the embodiment of the present disclosure. The first supporting module 14 includes two first lateral plates 46, a plurality of first rollers 48, a first contact plate 50, a first supporting component 52 and a rotary shaft 54. The rotary shaft 54 rotatably passes through the first pivot ends 24 of the two first lateral plates 46 and is further connected to the shaft hole portions 20 of the bracket 12. The plurality of first rollers 48 is rotatably disposed between the two first lateral plates 46, and an outer surface 481 of each first roller 48 substantially protrudes from an upper surface 461 of the first lateral plate 46. The first contact portion 50 is disposed on a side (such as a position close to the first pivot end 24) of the plurality of first rollers 48 adjacent to the second supporting module 16. The first supporting component 52 is disposed between the two first lateral plates 46 and located under the plurality of first rollers 48 to increase support strength.

The first lateral plate 46 can be a single curved structure. The first connective end 26 and the first open end 28 are two edge points of the curved structure, and the first pivot end 24 is a corner point of the curved structure. The plurality of first rollers 48 is located between the first open end 28 and the first pivot end 24 to hold an external box and the external box can move toward the first contact plate 50 by rotation of the first rollers 48. A curved structure of the first lateral plate 46 is not limited to the above-mentioned embodiment, and depends on design demand.

The second supporting module 16 can include two second lateral plates 56, a plurality of second rollers 58, a second contact plate 60, a second supporting component 62 and a rotary shaft 64, as shown in FIG. 1 to FIG. 3. The plurality of second rollers 58 is rotatably disposed between the two second lateral plates 56, and the second contact plate 60 is disposed on a side of the plurality of second rollers 58 adjacent to the first supporting module 14. Elements of the second supporting module 16 having the same designation as ones of the first supporting module 14 have the same structures, connections and functions, directional variation of element placement is the only difference between the first/second supporting modules, and a detailed description is omitted herein for simplicity.

The first supporting module 14 and the second supporting module 16 can rotate relative to the bracket 12 to switch between the recumbent position (as shown in FIG. 2) and the upright position (as shown in FIG. 3). A first rotating angle θ1 of the first supporting module 14 switching from the recumbent position to the upright position is substantially greater than a second rotating angle θ2 of the second supporting module 16 switching from the recumbent position to the upright position. The first contact portion 50 can contact against the second contact portion 60 since the first supporting module 14 and the second supporting module 16 are switched to the upright position, and the external box automatically slide from the first contact portion 50 to the second contact portion 60 due to its own gravity by an inclined plane formed between the first contact portion 50 and the second contact portion 60, which means the external box can be transferred from the first supporting module 14 to the second supporting module 16.

Figure 5:
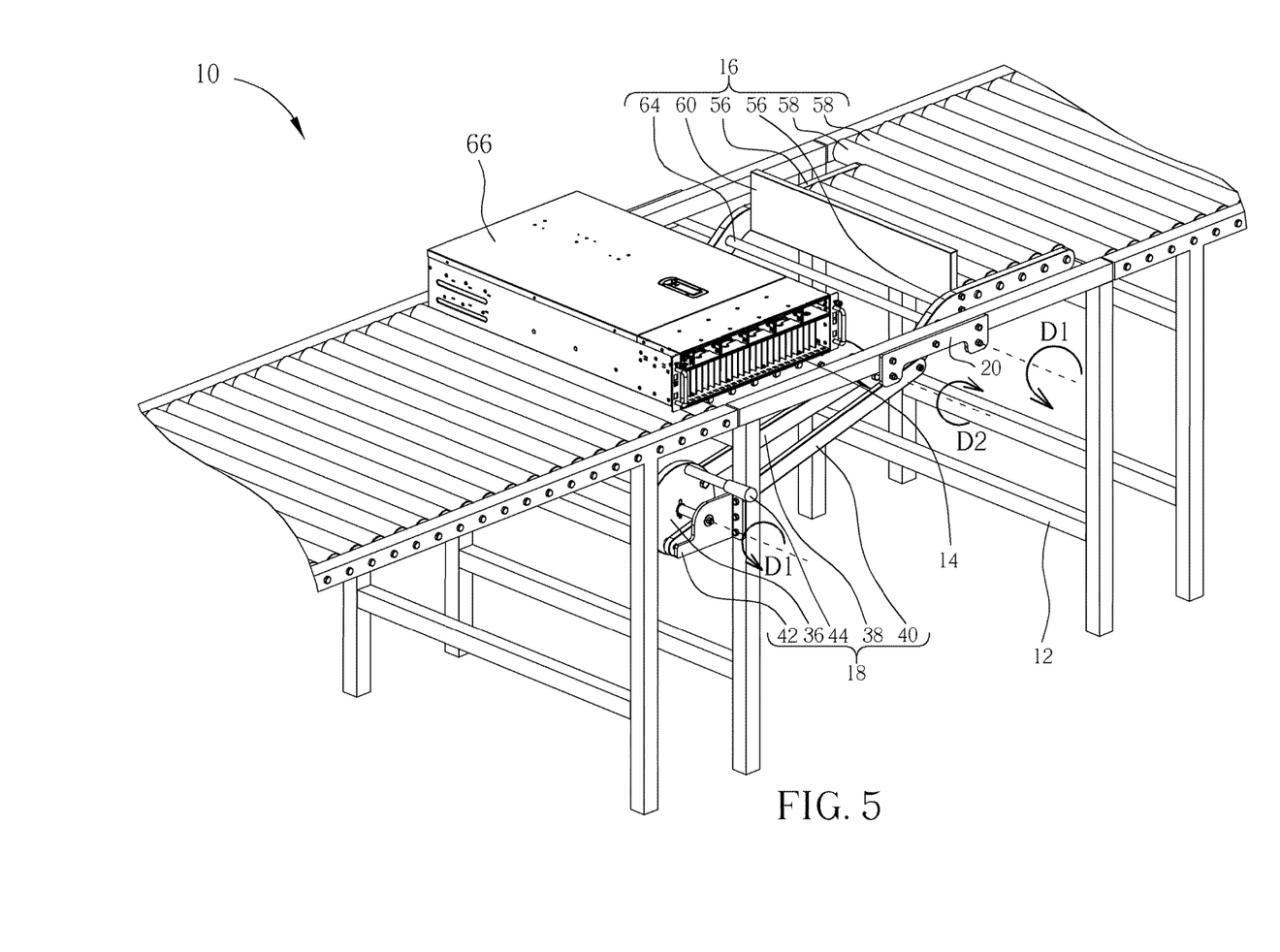
FIG. 5 to FIG. 7 are diagrams of a box applied to the rotary device in different operational modes according to the embodiment of the present disclosure.
Figure 6:
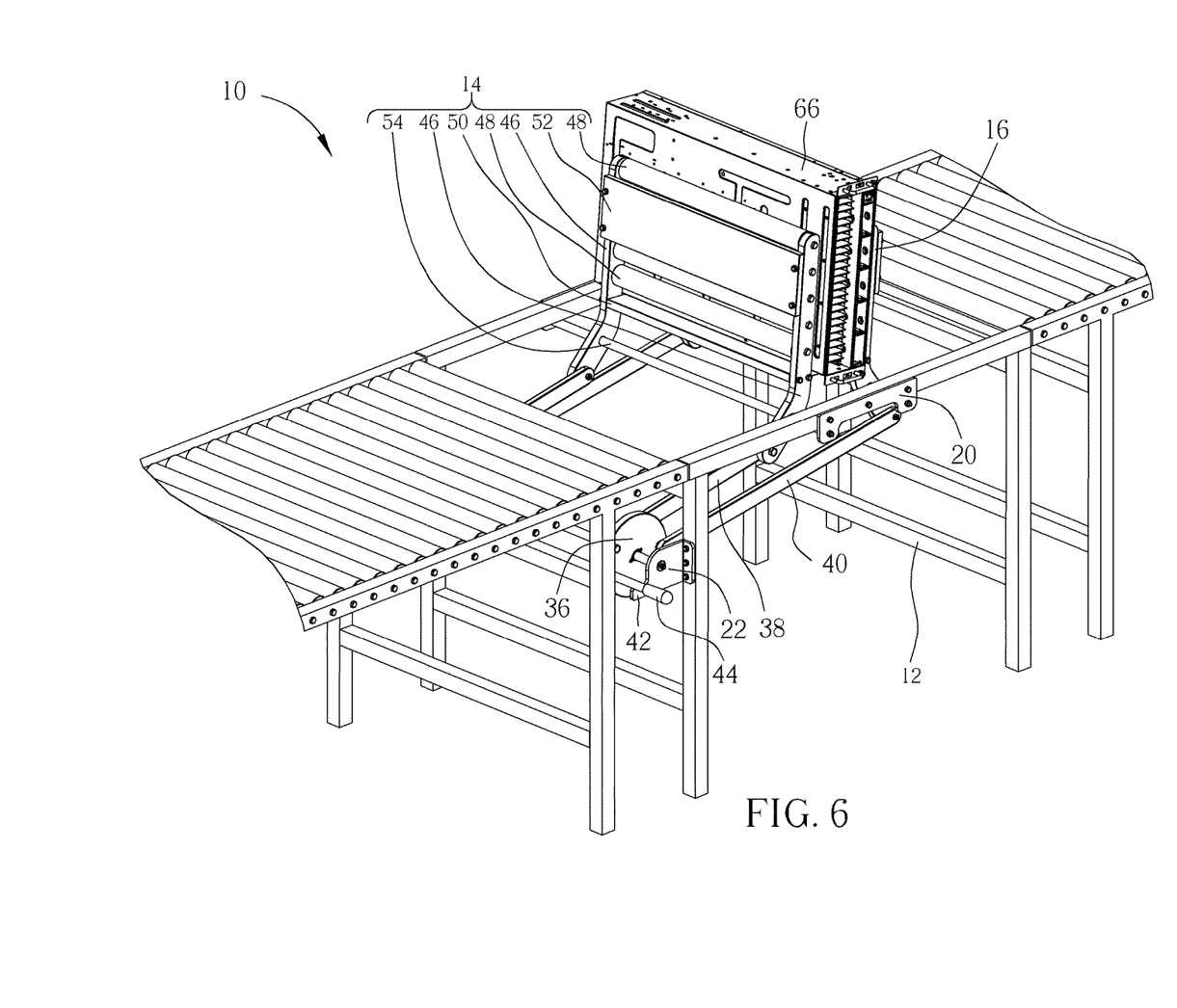
Figure 7:
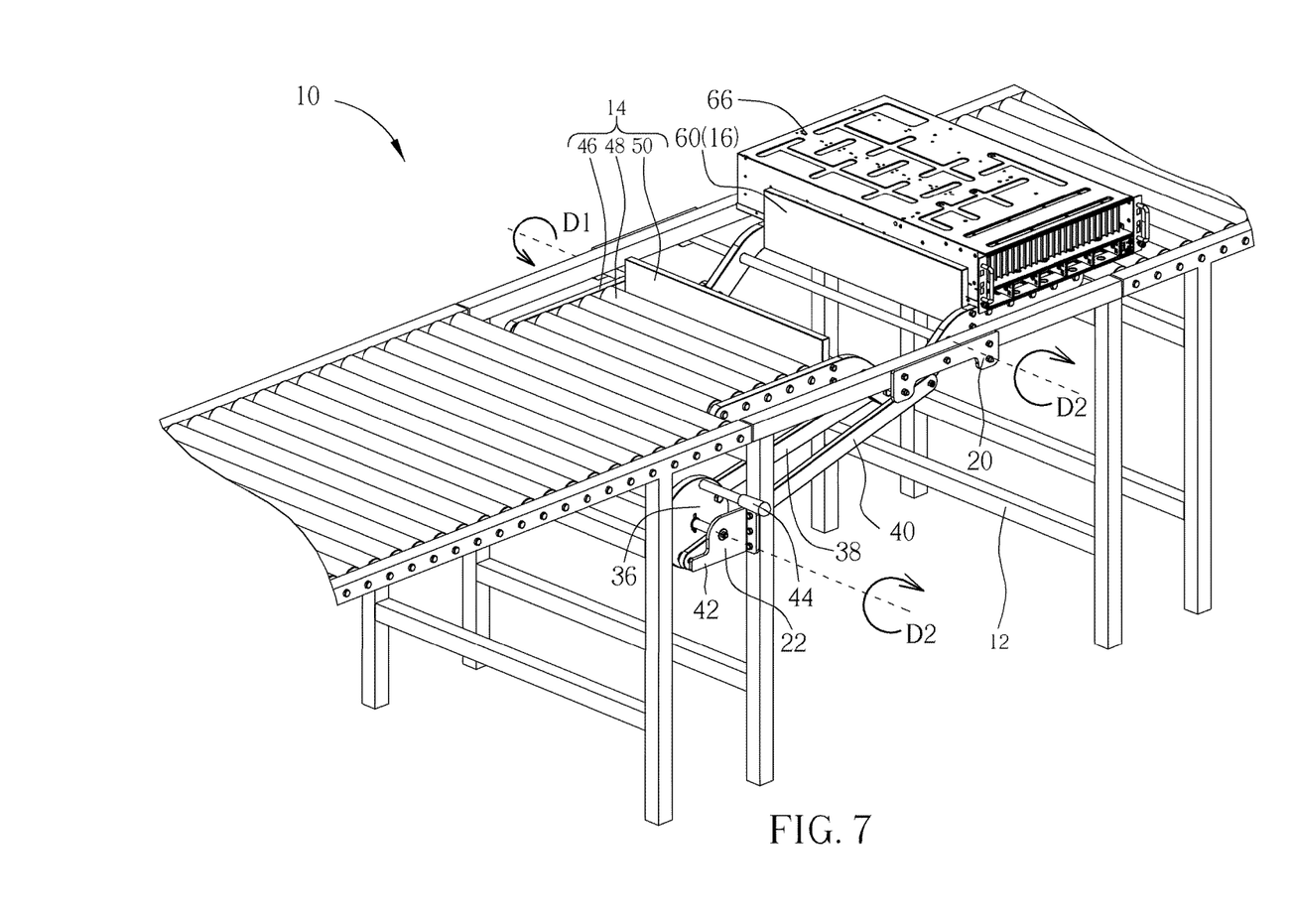

Please refer to FIG. 5 to FIG. 7. FIG. 5 to FIG. 7 are diagrams of the box 66 applied to the rotary device 10 in different operational modes according to the embodiment of the present disclosure. As shown in FIG. 5, the first supporting module 14 and the second supporting module 16 are switched to the recumbent position, the box 66 moves from left to right on the production line. The box 66 moves into the first supporting module 14 through the first open end 28 and stops its movement when contacting the first contact plate 50. The user can rotate the actuating component 36 at the first direction D1 by the handle 44 to adjust placement of the box 66. The first supporting module 14 can rotate at the second direction D2 and the second supporting module 16 can rotate at the first direction D1, so as to switch from the recumbent position to the upright position, as shown in FIG. 6. Because the first rotating angle θ1 is greater than the second rotating angle θ2, the box 66 can slide from the first contact plate 50 to the second contact plate 60 by the own gravity. As the box 66 is transferred to the second supporting module 16, the actuating component 36 is driven to rotate at the second direction D2 so as to rotate the first supporting module 14 and the second supporting module 16 respectively at the first direction D1 and the second direction D2, and then the first supporting module 14 and the second supporting module 16 are switched to the recumbent position, as shown in FIG. 7. The box 66 shown in FIG. 7 is the reverse placement (180 degrees' variation) of the box 66 shown in FIG. 5. The box 66 can be removed from the second supporting module 16 through the second open end 34.

Figure 8:
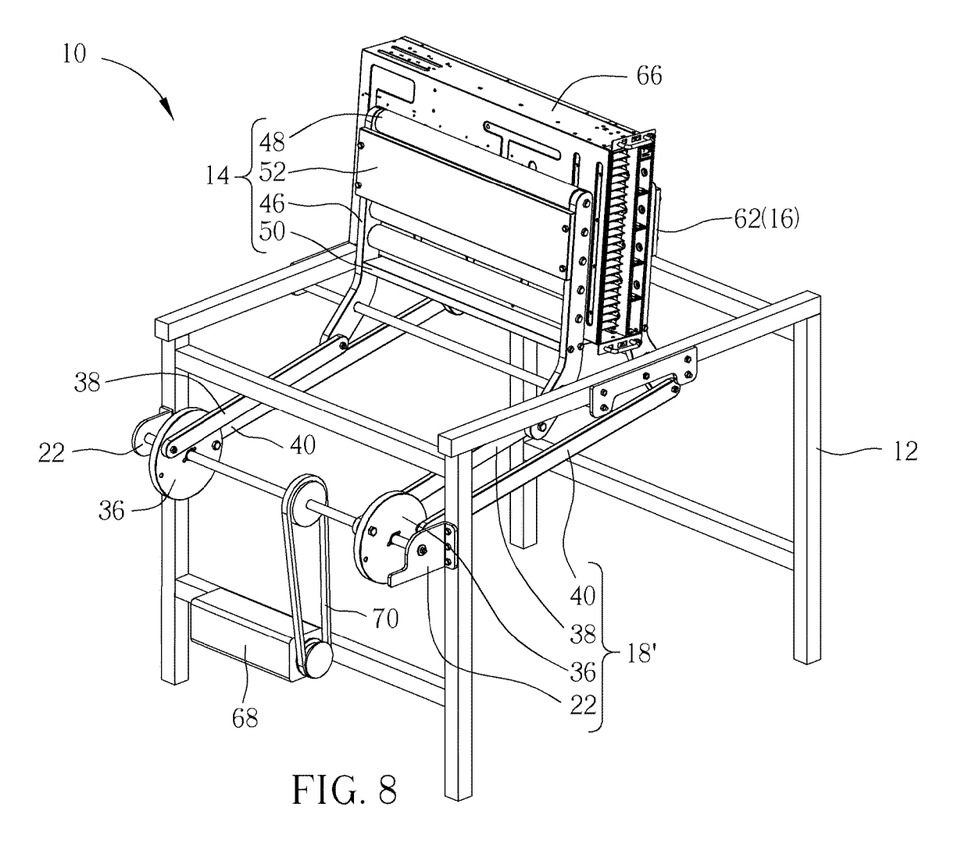
FIG. 8 is a diagram of the rotary device according to another embodiment of the present disclosure.

Please refer to FIG. 8. FIG. 8 is a diagram of the rotary device 10 according to another embodiment of the present disclosure. In this embodiment, elements having the same numeral as ones of the above-mentioned embodiment have the same structures and functions, and a detailed description is omitted herein for simplicity. Difference between the embodiments is the driving module 18' of the rotary device 10 further can include an electric motor 68 and a towing belt 70 to replace the handle 44 of the above-mentioned artificial-operation embodiment. The towing belt 70 is disposed between the electric motor 68 and the actuating component 36. When the driving module 18' is actuated, the electric motor 68 can rotate the actuating component 36 by the towing belt 70, the first supporting module 14 and the second supporting module 16 generate reverse rotation to automatically switch between the recumbent position and the upright position.

The rotary device of the present disclosure utilizes the driving module to reversely rotate the first supporting module and the second supporting module, so that the box can be automatically turned over when moving from the first supporting module to the second supporting module. The driving module includes the actuating component and the rods. The rods are respectively connected to the first supporting module, the second supporting module and the actuating component. The rods are preferably located on opposite sides relative to the axial center of the actuating component, so that rotation of the actuating component can reversely rotate the first supporting module and the second supporting module by the rods. Comparing to the prior art, the present disclosure drives the first supporting module and the second supporting module to generate reverse rotation to turn over the box, so the box is not buckled or pressed at any specific area, the box does not generate partial deformation by local pressure and can have aesthetic appearance.

Those skilled in the art will readily observe that numerous modifications and alterations of the device and method may be made while retaining the teachings of the disclosure. Accordingly, the above disclosure should be construed as limited only by the metes and bounds of the appended claims.

What is claimed is:

1. A rotary device capable of adjusting position of a box, the rotary device comprising:
a frame;
a first supporting module pivotally connected to the frame;
a second supporting module pivotally connected to the frame; and
a driving module for reversely rotating the first supporting module and the second supporting module simultaneously, the driving module comprising:
a holding component disposed on the frame;
an actuating component rotatably disposed on the holding component via an axle, the actuating component being a circular plate structure;
a first rod connected to the first supporting module and a side of the actuating component spaced from the axle; and
a second rod connected to the second supporting module and the other side of the actuating component spaced from the axle and opposite to the first rod, the first rod driving the first supporting module to rotate at a second direction and the second rod driving the second supporting module to rotate at a first direction while the actuating component rotates at the first direction, and the first direction being opposite to the second direction, wherein the first rod and the second rod are respectively connected to different positions on an edge of the circular plate structure.

2. The rotary device of claim 1, wherein the first supporting module comprises a first pivot end and a first connective end, the first pivot end is pivotally connected to the frame, and the first rod is connected to the first connective end.

3. The rotary device of claim 2, wherein the first supporting module comprises two first lateral plates, a plurality of first rollers and a first contact plate, the plurality of first rollers is rotatably disposed between the two first lateral plates, the first contact plate is disposed on a side of the plurality of first rollers adjacent to the second supporting module.

4. The rotary device of claim 3, wherein the first supporting module further comprises a first supporting component disposed between the two first lateral plates and located under the plurality of first rollers.

5. The rotary device of claim 3, wherein outer surfaces of the plurality of first rollers substantially protrude from an upper surface of the first lateral plate.

6. The rotary device of claim 3, wherein the first supporting module further comprises a first open end, the plurality of first rollers is located between the first open end and the first pivot end.

7. The rotary device of claim 6, wherein the first lateral plates are curved structures, the first open end and the first connective end respectively are edge points of the curved structure, and the first pivot end is a corner point of the curved structure.

8. The rotary device of claim 3, wherein the second supporting module comprises two second lateral plates, a plurality of second rollers and a second contact plate, the plurality of second rollers is rotatably disposed between the two second lateral plates, the second contact plate is disposed on a side of the plurality of second rollers adjacent to the first supporting module.

9. The rotary device of claim 8, wherein the first supporting module and the second supporting module rotate relative to the frame to switch between a recumbent position and an upright position.

10. The rotary device of claim 9, wherein a first rotating angle of the first supporting module switching from the recumbent position to the upright position is substantially greater than a second rotating angle of the second supporting module switching from the recumbent position to the upright position.

11. The rotary device of claim 9, wherein the first contact plate contacts against the second contact plate while the first supporting module and the second supporting module are switched to the upright position.

12. The rotary device of claim 1, wherein the second supporting module comprises a second pivot end and a second connective end, the second pivot end is pivotally connected to the frame and is adjacent to the first pivot end, and the second rod is connected to the second connective end.

13. The rotary device of claim 1, wherein the driving module further comprises a handle disposed on the actuating component.

14. The rotary device of claim 1, wherein the driving module further comprises an electric motor and a pulling belt, the pulling belt is disposed between the electric motor and the actuating component, the electric motor utilizes the pulling belt to rotate the actuating component.

15. The rotary device of claim 1, wherein the holding component comprises a contacting portion to constrain a rotating range of the actuating component.

\* \* \* \* \*

UNITED STATES PATENT AND TRADEMARK OFFICE
CERTIFICATE OF CORRECTION

PATENT NO.         : 9,758,314 B2
APPLICATION NO.    : 14/644176
DATED              : September 12, 2017
INVENTOR(S)        : Zhong-hui Mao It is certified that error appears in the above-identified patent and that said Letters Patent is hereby corrected as shown below:

On the Title Page

Item (30), correct the application number of CN priority application from "2014 2 0471114 U" to --2014 2 0471114.X--.

Signed and Sealed this
Twenty-first Day of November, 2017

Joseph Matal
*Performing the Functions and Duties of the*
*Under Secretary of Commerce for Intellectual Property and*
*Director of the United States Patent and Trademark Office*